United States Patent
Saito (10) Patent No.: US 6,418,508 B1
(45) Date of Patent: *Jul. 9, 2002

(54) INFORMATION STORAGE CONTROLLER FOR CONTROLLING THE READING/ WRITING OF INFORMATION TO AND FROM A PLURALITY OF MAGNETIC DISKS AND AN EXTERNAL DEVICE

(75) Inventor: Kenji Saito, Katano (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 883 days.

(21) Appl. No.: 08/604,829

(22) Filed: Feb. 22, 1996

(30) Foreign Application Priority Data

Feb. 22, 1995 (JP) ............................................. 7-033784

(51) Int. Cl.[7] ............................................. G06F 13/00
(52) U.S. Cl. ...................................................... 711/112
(58) Field of Search .............................. 360/47, 39, 54; 395/182.01–182.05, 404, 275, 200, 200.44; 711/112, 114

(56) References Cited

U.S. PATENT DOCUMENTS

| | | | |
|---|---|---|---|
| 4,303,988 A | 12/1981 | Tsuboka et al. ............ 711/113 |
| 5,088,081 A | * 2/1992 | Farr .............................. 369/54 |
| 5,128,810 A | 7/1992 | Halford ........................ 360/39 |
| 5,163,131 A | * 11/1992 | Row et al. .................... 395/200 |
| 5,163,132 A | 11/1992 | DuLac et al. .................. 710/53 |
| 5,182,801 A | * 1/1993 | Asfour ................... 395/200.44 |
| 5,257,391 A | * 10/1993 | DuLac et al. ............... 395/800 |
| 5,337,414 A | * 8/1994 | Hashemi et al. ............ 395/275 |
| 5,485,606 A | * 1/1996 | Midgdey et al. .......... 360/47 X |
| 5,588,012 A | * 12/1996 | Oizumi ...................... 371/51.1 |
| 5,603,058 A | * 2/1997 | Belknap et al. ........... 360/39 X |

FOREIGN PATENT DOCUMENTS

EP            0 187 027            7/1986

* cited by examiner

Primary Examiner—David L. Robertson
(74) Attorney, Agent, or Firm—Wenderoth, Lind & Ponack, L.L.P.

(57) ABSTRACT

An information storage controller comprises two memory groups. One memory group is used for external communication, while the other memory group communicates with a plurality of magnetic disks, so that work in each memory group is performed in parallel. Information is transmitted between the external equipment and the magnetic disk by a switch means. Further, the information storage controller comprises a redundant information generation circuit for reading information from a plurality of memories with an exclusive circuit which simultaneously generates redundant information and verifies and recovers data. Thus, a high speed information storage controller connected to a plurality of magnetic disks can be provided.

5 Claims, 5 Drawing Sheets

INFORMATION STORAGE CONTROLLER FOR CONTROLLING THE READING/WRITING OF INFORMATION TO AND FROM A PLURALITY OF MAGNETIC DISKS AND AN EXTERNAL DEVICE

BACKGROUND OF THE INVENTION

1. Field of the Invention

The present invention relates to an information storage controller for high speed information transmission in a magnetic storage device or the like.

2. Description of the Prior Art

Recent development of digital compression technology of visual and audio signals makes it possible to process visual and audio signals by a computer and to store the signals in a magnetic storage device which can be accessed by a computer.

As to visual and audio signals, a problem often encountered is that an image or a sound is stopped when the processing of a prescribed amount of information is not completed in a prescribed time. In order to prevent this problem, a high speed magnetic storage device is required for high speed information processing.

Further, it is also required to increase a memory capacity and to store a large capacity of information. A technique called the redundant array of inexpensive disk (herein referred to as RAID) is used practically in order to meet this requirement.

A RAID is an information storage controller which controls a plurality of magnetic disks so that redundant information as well as information to be stored are stored in the magnetic disks in a distributed manner. When one of the magnetic disks fails, it can recover the information in the failed magnetic disk according to the redundant information. Then, a normal operation can be performed again.

RAID-5 (or RAID level 5), as one of the techniques of RAID, stores redundant information in a plurality of magnetic disks cyclicly. Let us assume that the information storage controller (RAID-5) has five magnetic disks HD1–HD5. Information to be written is divided into four sets of information D1–D4. First, the sets of information D1–D4 are written to four magnetic disks HD1–HD4, respectively, and redundant information P1 is generated for the sets of information D1–D4 to be written to the fifth magnetic disk HD5. Subsequently, when sets of information D5–D8 are written, the sets of information are written to HD2–HD5, while redundant information P2 for the sets of information D5–D8 is written to the first magnetic disk HD1. In this way, redundant information P1, P2, . . . are stored cyclicly to a magnetic disk which is different than the magnetic disk which stored the previous redundant information.

However, in the information storage controller, when information is written to a plurality of magnetic disks, redundant information has to be generated. Then, write operations may become slower than in a case using a single magnetic disk. Further, when one of the magnetic disks has a fault, processing speed becomes very slow in order to restore the information in the faulty magnetic disk. Further, when the faulty magnetic disk is changed with a new one, the information in the faulty magnetic disk has to be restored in the new one automatically. However, the operation speed becomes rather slow during this operation. This is ascribed to the work required to generate redundant information and to write it to a prescribed memory after the central processing unit reads data a plurality of times (sequential read). This work is performed for all the data, thus a long processing time is needed.

Further, in the prior art information storage controllers, work on each magnetic disk and an input/output operation with the external are performed in time sharing. That is, only one work is performed at a time.

SUMMARY OF THE INVENTION

An object of the invention is to provide an information storage controller having a higher speed of information transmission with magnetic storage devices.

The information storage controller according to the invention comprises an external communication means for communicating information with the external equipment; a plurality of magnetic disk communication means for communicating information with the magnetic disk; first and second groups each consisting of a plurality of memory devices, a number of the memory devices in said first and second groups being equal to that of the magnetic disk communication means; and a switch means for enabling communication between the second group and each of said magnetic disk communication means when communication between the first group and the external communication means is enabled and for enabling communication between the first group and each of the external communication means when communication between the second group and the external communication means is enabled. In the above-mentioned information storage controller, the first and second memory groups perform work with the external communication means or with the magnetic disk communication means alternately by the switch means, and each memory group performs work in parallel. Then, information transmission speed is improved.

An advantage of the present invention is that the write speed and read speed to and from the magnetic disks can be increased by using the first memory group, the second memory group, and the switch means for changing the state of work.

Further, another advantage of the present invention is that, by providing an exclusive redundant information generation circuit, generation of redundant information or verification and recovery of data can be performed at a fast speed, and parallel work by the switch means becomes more efficient in the information storage controller.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
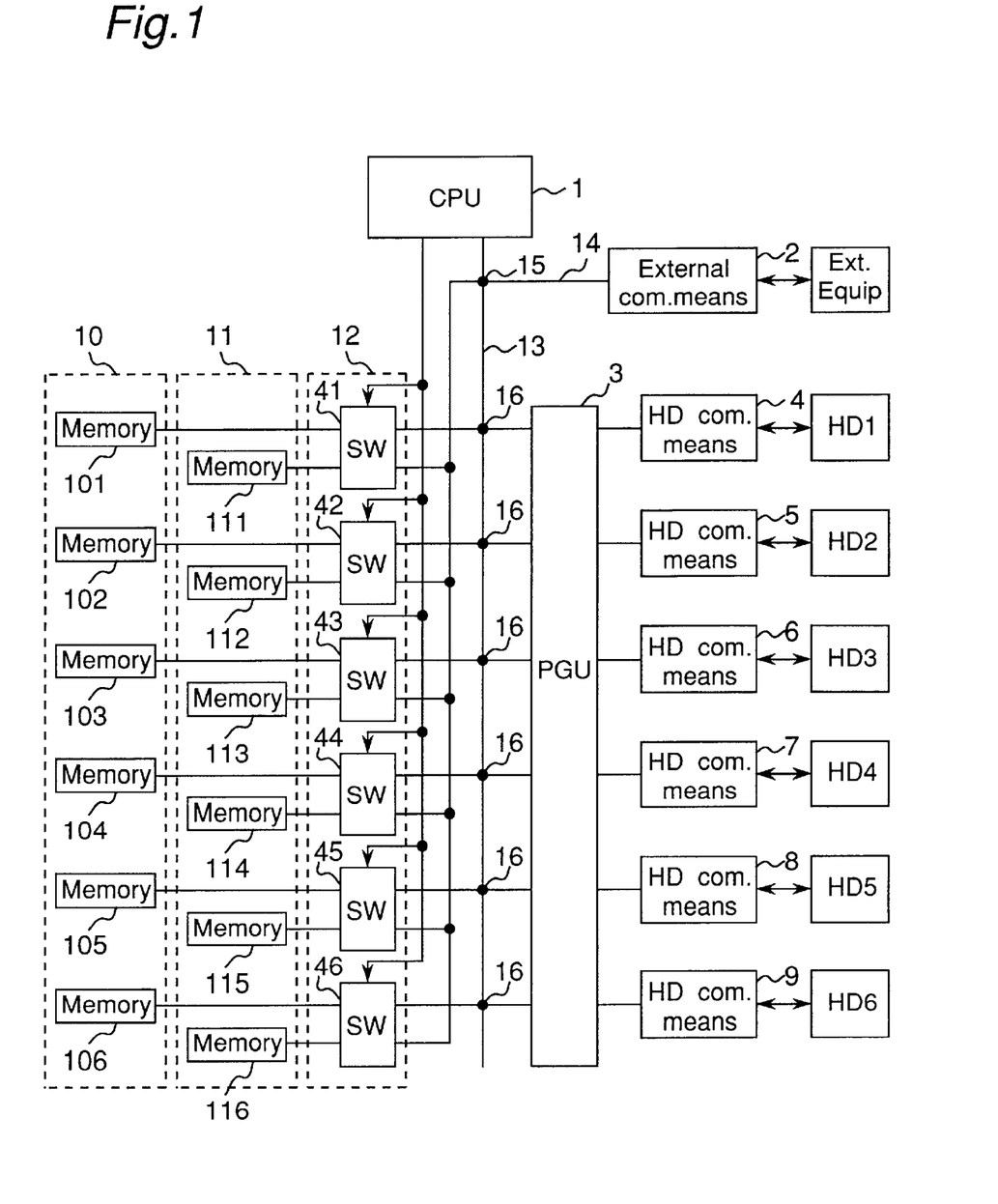
FIG. 1 is a lock diagram on a structure of an information storage controller of an embodiment of the invention.

Referring now to the drawings, wherein like reference characters designate like or corresponding parts throughout the several views, FIG. 1 shows an information storage controller of an embodiment of the invention. Two memory groups, a first memory group 10 and a second memory group 11 are correspondingly provided for the six magnetic disks. The first memory group 10 and the second memory group 11 each comprise six memories 101, 102, 103, 104, 105, 106 and 111, 112, 113, 114, 115, 116, respectively. A central processing unit (hereinafter referred to as CPU) 1 is connected through a CPU bus 13 to six switches 41, 42, 43, 44, 45, 46 in the switch means 12 and sends a control signal therefor. Each switch 41–46 is connected to a memory in the first memory group 10 and to a counterpart memory in the second memory group 11. That is, the switches 41–46 select one of the pair of the memories according to the control signal received from the CPU 1, so as to send information from one of the memories through an external communication means 2, made of a component such as the NCR 53C720, to an external equipment, or to one of the magnetic disks HD1–HD6 through a redundant information generation unit 3 and one of magnetic disk communication means 4, 5, 6, 7, 8, 9 (hereinafter referred to as HD communication means) made of a component such as the NCR 53C720. The controller controls six magnetic disks HD1, HD2, HD3, HD4, HD5 and HD6 connected thereto. In this example, the hard disk drive connected to the HD communication line 4 is referred to as HD1, the hard drive disk connected to the HD communication line 5 is referred to as HD2, the hard disk drive connected to the HD communication line 6 is referred to as HD3, the hard disk drive connected to the HD communication line 7 is referred to as HD4, the hard disk drive connected to the HD communication line 8 is referred to as HD5, and the hard disk drive connected to the HD communication line 9 is referred to as HD6.

The CPU 1 is connected to a bus 14 at a contact point 15 for opening or closing a connection of the CPU bus 13 with the bus 14 and to six contact points 16 to be opened or closed on communication between the CPU 1, the redundant information generation unit 3 and each HD communication means 4–9. The contact point 15 is closed by the CPU 1 to connect the CPU 1 to the external communication means 2, so that a command from the CPU 1 is transmitted to the external communication means 2. When the transmission completes, the external communication means 2 informs the CPU 1 of the completion, and the CPU 1 opens the point 15 so as to allow communication between the external communication means 2 with the switch means 12, while the bus 14 is changed to an open state (or a high impedance state). When the CPU 1 sends a command to the contact point 15, the bus is in the open state, so that no collision of information occurs. Similarly, the contact point 16 is closed only when a command is sent from the CPU 1 to each HD communication means 4–9 and to the redundant information generation circuit 3, and it is opened when the transmission is completed. In this case, no collision of information occurs.

Figure 2:
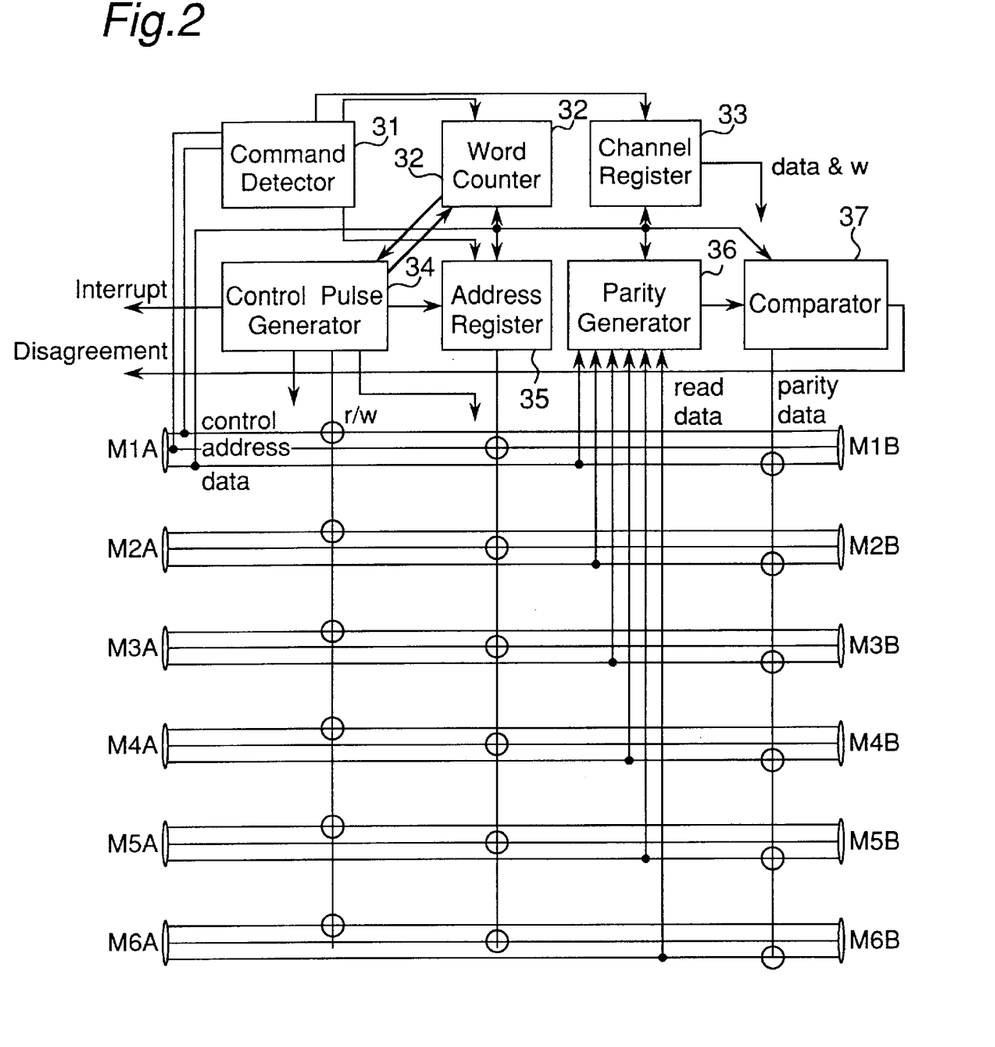
FIG. 2 is a block diagram of a redundancy information generation unit.

FIG. 2 shows the redundancy information generation unit 3 as comprising components 31–36 and the connection of six buses thereof at the contact points 16 to be connected to the six buses M1A–M6A extending from the CPU 1 and to six buses M1B–M6B extending to the switches 41–46 and to the HD communication means 4–9. Open circles in FIG. 2 show the contact points 16.

When information is received from the external communication means 2 to be stored in a hard disk, the CPU 1 divides the information received from the external communication means 2 to a prescribed amount of data to be stored in the memories in the memory groups 10 and 11 at the same area therein. Next, the CPU 1 instructs the redundant information generation unit 3 to generate redundant information by designating a start address in the memory area, a memory region (word number), and a memory for the redundant information to be stored.

Figure 3:
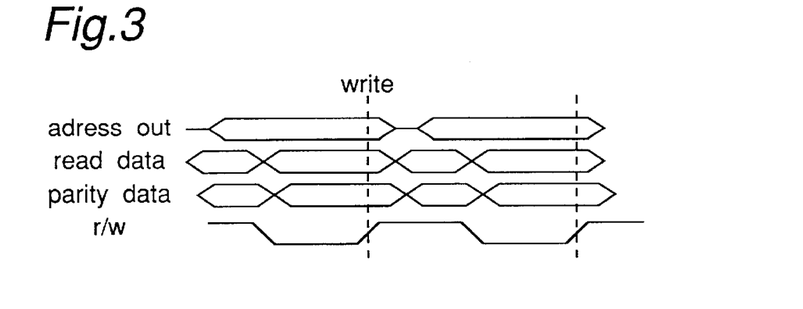
FIG. 3 is a timing chart of the generation of redundant information.

In the redundant information generation unit 3, a command detector 31 monitors signals at the bus MIA to detect a command sent from the CPU 1 to the redundant information generation unit 3. A command includes three kinds of information: an address data for an address register 35 as a memory start address, a channel data for a channel register 33 for designating a memory (bus) for generating redundant information, and a word number for a word counter 32. The command detector 31 detects the command and sets data in the register and the like 32, 33 and 35. When data is set in the word counter 32, the control pulse generator 34 is informed. Then, the control pulse generator 34 performs the operations as shown in FIG. 3 on a timing of the generation of redundant information. First, a r/w signal generated by the control pulse generator 34 is connected to a write line (w) in the bus designated by the channel register 33 among the buses M1A to M6A and to the read lines (r) for the other buses. Next, an address signal generated by the address register 35 is connected to the same address for the buses MIA to M6A. Then, an output of a parity generator 36 which generates a parity data for six read data lines is connected to the bus designated by the channel register 33.

Figure 4:
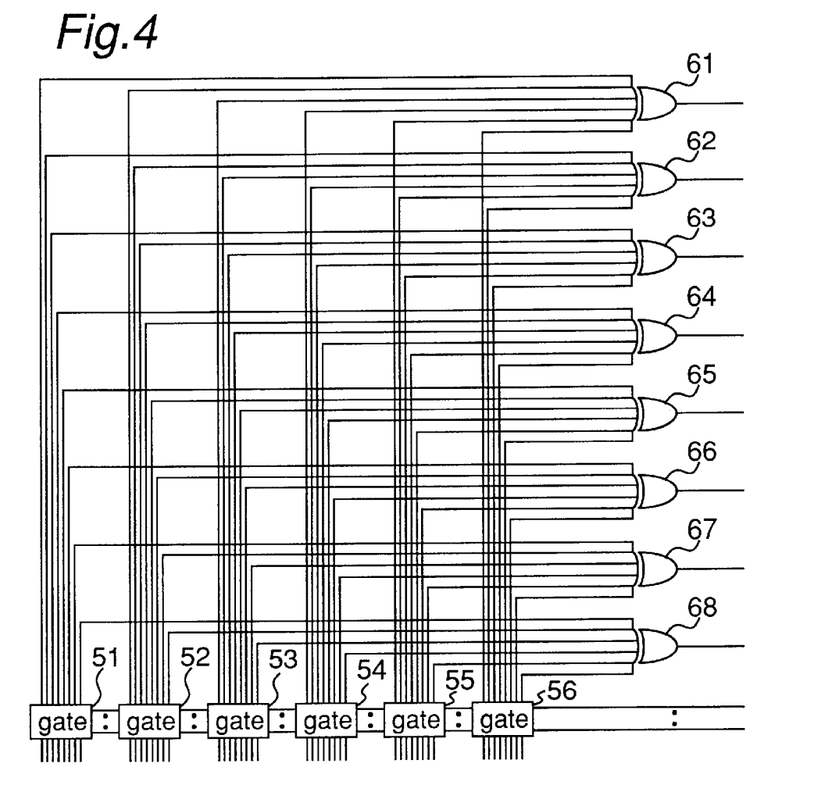
FIG. 4 shows an example of a parity generator used in the redundant information generation unit.

FIG. 4 shows an example of the parity generator 36 used in the redundant information generation unit 3. Data of eight bits from each of the six memories received at six gates 51–56 are sent to eight XOR gates 61–68 to generate an 8-bit parity data for redundant information to be stored. The gate which corresponds to the memory designated by the channel register 33 does not send signals to the XORs.

Figure 5A:
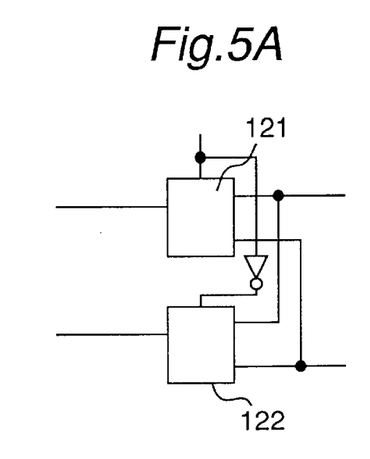
FIG. 5A is a block diagram of a switch in the switch means.
Figure 5B:
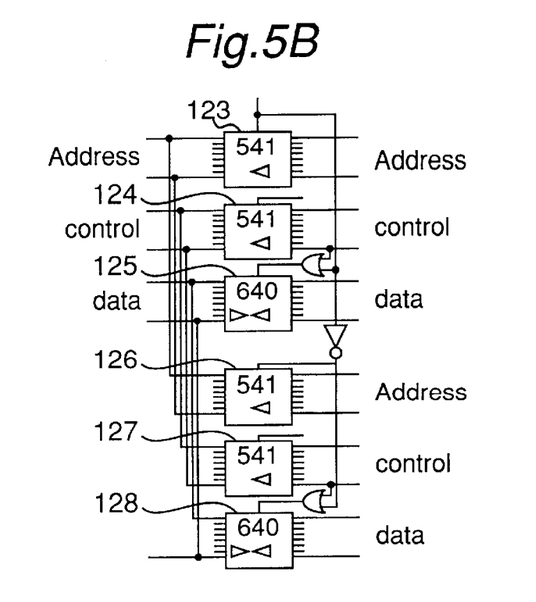
FIG. 5B is block diagram of an example of the switch.

FIG. 5A shows an example of the switch 41–46 in the switch means 12 comprising a pair of switch units 121 and 122. Buses from the memory 101–106 in the first memory group 10 are connected to one input of the switch units 121 and 122, while the counterparts from the memory 111–116 in the second memory group 11 are connected to the other inputs thereof. On the other hand, a control signal and an inverted signal thereof are supplied to the switch units 121 and 122. FIG. 5B shows an example of the switch units 121, 122 each comprising CMOS integrated circuits 123–128 connected to an address bus, a control bus, and a data bus. However, the switch units 121, 122 may be made of a gate array.

Data at the address are supplied to the parity generator 36 from the memories not designated by the channel register 33, and redundant information is generated according to the data by the parity generator 36. The redundant information is written to the memory designated by the channel register 33. A pulse from the control pulse generator 34 is sent to the address register 35 to increase the address by one, and the address is sent to the word counter 32 to decrease the count by one. As explained above, when the control pulse generator 34 generates a r/w signal, redundant information at a successive address is generated and written to the relevant memory.

This processing is repeated until the word counter 32 becomes zero. Then, the control pulse generator 34 stops generation of redundant information, and the CPU 1 is informed of the completion with an interrupt signal. Then, the CPU 1 connects the buses M1A to M6A to buses M1B to M6B at the contact points 16.

As explained above, the controller is connected through the HD communication means 4–9 to the six hard disk drives HD1–HD6, and it is required to specify whether HD connection exists or not and which lines are designated as main lines and spare line. The main line refers to a hard disk drive which is actually used, while the spare line refers to a hard disk drive which is not used except when a fault arises in one of main line HDs. That is, when a fault is generated in a main line hard disk, the information in the faulty hard disk drive is generated in the spare line hard disk drive according to redundancy information in another normal hard disk drive, and the faulty hard disk drive is not used.

In this embodiment, the main line hard disk drives are connected to the HD communication means 4, 5, 6, 7 and 8, while the spare line hard disk is connected to the HD communication means 9.

The external communication means 2 communicates with the HD communication means 4, 5, 6, 7, 8 and 9 with direct memory access (called as DMA) independently of the CPU 1. Further, the external communication means 2 and the HD communication means 4, 5, 6, 7, 8 and 9 use the small computer system interface (SCSI) standard, and a write or read instruction by the CPU 1 specifies a logic block address and a transmission block number. A logic block usually consists of 512 bytes.

Each switch 41–46 in the switch means 12 is operated according to a control signal generated by the CPU 1. When memories in the first memory group 10 are connected to the bus 14, memories in the second memory group 11 are connected to the redundant information generation unit 3 (referred to as state A), while when memories in the first memory group 10 are connected to the redundant information generation unit 3, memories in the second memory group 11 are connected to the bus 14 (referred to as state B).

Further, the contact points 15 and 16 are opened or closed, if necessary, when a request, or an instruction, is communicated by the CPU 1 through the buses M1A–M6A, the external communication means 2, HD communication means 4–9 and the like.

When information in the memories is output through the external communication means 2, the CPU 1 instructs the hard disk drives through the HD communication means 4–9 to read information in the same designated area from the same designated address. The information read from each hard disk drive is stored in a relevant memory. When a hard disk drive is found to have a fault, the CPU 1 designates a memory corresponding to the faulty hard disk drive and instructs the generation of redundant information which corresponds with information stored in the faulty hard disk drive. The generation of the redundant information is similar to the storing of information as explained above. If no hard disk drive has a fault, it is unnecessary to restore the information according to the redundant information.

Figure 6:
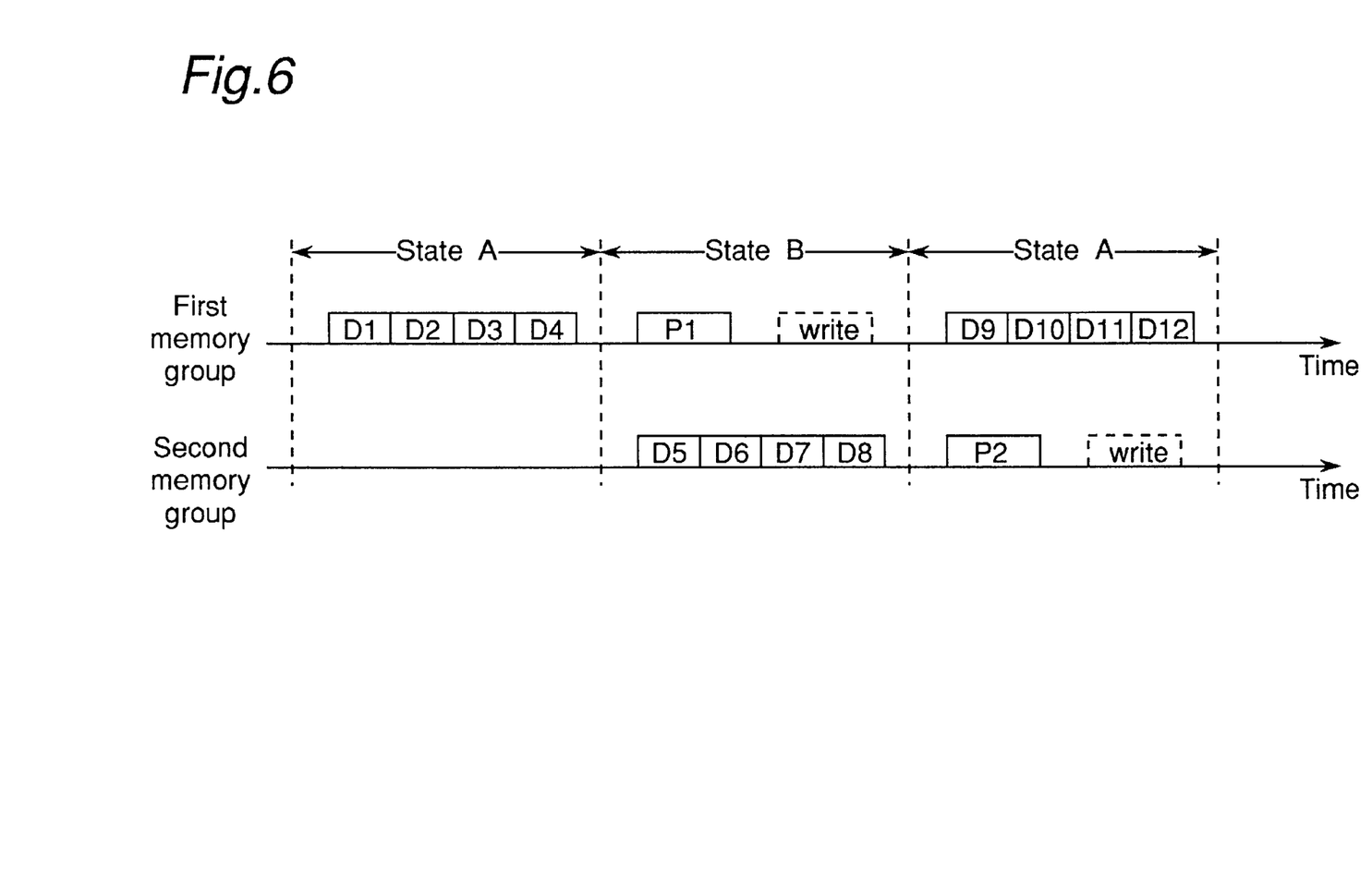
FIG. 6 is a timing chart of data written to a magnetic disk in the embodiment.

An operation of the information storage controller of the embodiment is explained below. In a case explained below, the information storage controller is connected to five hard disks HD1–HD5. First, operation is explained when information from the external equipment is written to one or more magnetic disks. FIG. 6 shows a timing chart of this operation. The external communication means 2 first analyzes an instruction from the external equipment to detect a write request. In response to the request, the CPU 1 changes the switch means 12 (switches 41–46) to the state A. Next, the CPU 1 instructs transmission of information D1 of one block (512 bytes) to the memory 101 in the first memory group 10. The external communication means 2 transmits the read information D1 successively, and after the transmission of one block completes, the external communication means 2 informs the CPU 1 of the completion by an interrupt signal. Similarly, the informations D2, D3 and D4 are transmitted through the external communication means 2 to the memories 22, 23 and 24, successively.

After the transmission, the CPU 1 changes the switch means 12 to the state B. Thus, work between each HD communication means 4–9 and the first memory group 10 is possible, and work between the external communication means 2 and the second memory group 11 is also possible.

Similarly t o the state A, information D5, D6, D7 and D8 are transmitted to the memories 112, 113, 114 and 115 in the second memory group 11. In parallel to this operation, the CPU 1 instructs the redundant information generation circuit 3 to generate redundant information P1 by reading the information D1, D2, D3 and D4 stored in the memories 101, 102, 103 and 104 and writing it to the memory 105. The redundant information generation circuit 3 reads data in the memories 101, 102, 103 and 104 simultaneously for each byte, generates the redundant information P1 by the parity generator 36 and writes it to the memory 25 by the channel register 33. The redundant information generation unit 3 performs this operation on one block, and sends an interrupt signal to the CPU 1 to inform the completion of the operation. Then, the CPU 1 instructs the writing of the information D1, D2, D3 and D4 and the redundant information P1 to the hard disk drives. In this stage, the redundant information generation unit 3 only passes each information therethrough.

The HD communication means 4, 5, 6, 7 and 8 write the information in the memories to hard disk drives HD1, HD2, HD3, HD4 and HD5, respectively, and each HD communication means 4–8 informs the CPU 1 of the completion of write to the CPU 1 with an interrupt signal. Then, the CPU 1 changes the switch means 12 to the state A.

The above-mentioned operation is cycling repeated by the hard disk drive such that the redundant information is written until all the information is completely written.

Figure 7:
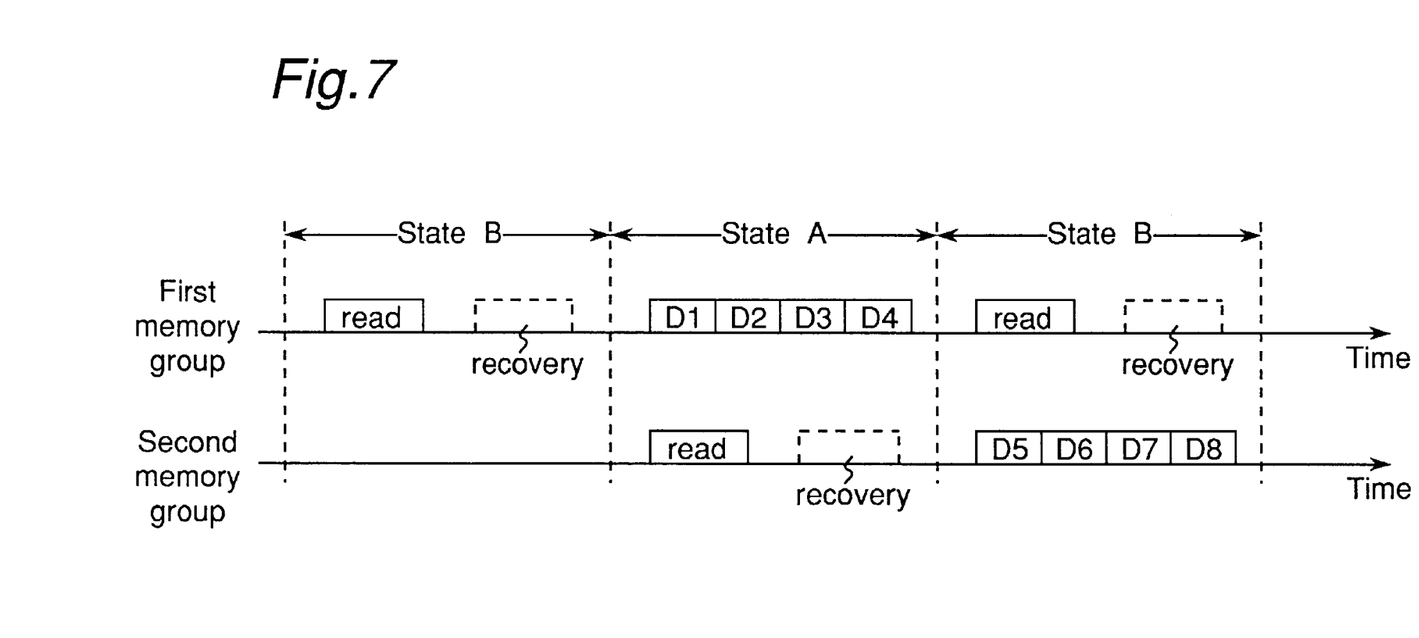
FIG. 7 is a timing chart of data output to an external communication means in the embodiment.

Next, it is explained that information in the hard disks is read to be output to the external communication means 2. FIG. 7 is a timing chart of this operation. First, the external communication means 2 analyzes an instruction from the external equipment to detect a read instruction. The CPU 1 changes the switch means 12 to the state B corresponding to the instruction. This allows work to be performed between each HD communication means 4–8 and the memories in the first memory group 10. Next, the CPU 1 instructs the HD communication means 4 to read data of one block from the hard disk drive HD1 to the memory 101. Similarly, it instructs the reading of data from the HD communication means 5, 6, 7 and 8 to the memories 102, 103, 104 and 105, respectively. This read operation to each memory of the first memory group 10 is performed in parallel. In this case, the redundant information generation circuit 3 only passes each information therethrough. Each HD communication means 4–8 informs the completion of the read operation to the CPU 1 with an interrupt signal. When the read operation is not completed within a predetermined time, it is decided that the hard disk drive has a fault. A faulty hard disk is also found when a hard disk drive is found to have a fault in a status confirmation thereon. A faulty hard disk drive is not used for read operations.

If there is a faulty hard disk drive, the CPU 1 enables writing to the memory corresponding to the faulty hard disk drive and instructs the redundant information generation circuit 3 to recover the data. If there is no faulty hard disk drive, this recovery is not needed. However, verification of the information is performed. That is, when information is read from the magnetic disks, information is read simultaneously from a designated address of the memories which do not correspond to the faulty hard disk drive. Redundant information is generated from the read information, and the redundant information is verified on the information at the address of the memory which corresponds to the faulty hard disk drive.

After completion of the reading or recovery of data when a faulty hard disk drive is found, the CPU 1 changes the switch means 12 to the state A. Similar to state B, the CPU 1 instructs each HD communication means 4–8 to read a block of data from a specified address in the memories in the second memory group 11. Each HD communication means 4–8 informs completion of the read with an interrupt signal to the CPU 1. In parallel to this operation, the CPU 1 instructs the external communication means 2 to output the information D1 of one block in the memory 101 to the external equipment. The completion of output of one block is informed by the external communication means 2 to the CPU 1 with an interrupt signal. The CPU 1 instructs the external communication means 2 to output the information D2 of one block in the memory 102. Similarly, the CPU 1 also instructs the external communication means 2 to output the information D3 and D4 of one block in the memories 103 and 104, respectively. After the completion of the output of the information, the switch means 12 is changed to the state B. The above-mentioned operation is repeated until processing on all the information to be read is completed.

As explained above, in this embodiment, a combination of the external communication means 2 and each HD communication means with the first and second memory groups alternately is changed by the switch means 12 for parallel work. Thus, speeds of writing to and reading from the hard disk drives can be increased. In this embodiment, because a bus is provided for each hard disk drive, work can be completely performed in parallel. Therefore, processing speeds become faster than a case with a single bus which is used in time sharing.

The external communication means 2 uses SCSI standards, but other types of communication techniques may also be used.

In this embodiment, the number of the magnetic disks is six (five main lines and one spare line). However, the present invention is not limited to this example.

The redundant information generation unit 3 is provided between each memory and each magnetic disk communication means in this embodiment. However, the redundant information generation unit 3 may be connected to each memory in the memory groups 10 and 11 used for work with the magnetic disk communication means 4–9, while each memory in the memory groups 10 and 11 used for work with the magnetic disk communication means 4–9 is connected to each magnetic disk communication means, not through the redundant information generation unit 3. Further, though the redundant information unit 3 is provided in the controller in this embodiment, if the controller is operated in a state such as RAID-0 which needs no redundant information, the redundant information generation unit 3 may not be provided so that the magnetic disk communication means are connected directly to each memory.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. An information storage controller for controlling a reading and writing of information to and from a plurality of magnetic disks and an external equipment, said controller comprising:

an external communication means for communicating information with the external equipment;

a plurality of magnetic disk communication means for communicating information with the plurality of magnetic disks;

a first group of memory devices comprising a plurality of memory devices equivalent in number to said plurality of magnetic disk communication means;

a second group of memory devices comprising a plurality of memory devices equivalent in number to said plurality of magnetic disk communication means;

a switch means for enabling connection alternately between (a) and (b):
(a) said second group of memory devices and said magnetic disk communication means and between said first group of memory devices and said external communication means; and
(b) said first group of memory devices and said magnetic disk communication means and between said second group of memory devices and said external communication means;

wherein each of said plurality of magnetic disk communication means is alternately connected to one of said plurality of memory devices from said first group of memory devices and to one of said plurality of memory devices from said second group of memory devices; and a switch controller for controlling said switch means so as to enable communication alternately between (a) and (b):
(a) said second group of memory devices and said magnetic disk communication means and between said first group of memory devices and said external communication means; and
(b) said first group of memory devices and said magnetic disk communication means and between said second group of memory devices and said external communication means.

2. The information storage controller according to claim 1, further comprising a redundant information generation circuit comprising a means for:

reading information, from an at least one designated memory device among said first or said second group of memory devices in which communication with said magnetic disk communications means is enabled by said switch controller, so as to generate redundant information, wherein the redundant information is generated simultaneously with the writing of information to any of said plurality of magnetic disks; and writing the redundant information to any memory device among said first or second group of memory devices other than the at least one designated memory device.

3. The information storage controller according to claim 2, further comprising a verification means for verifying the generated redundant information with information read from any memory device among said first or second group of memory devices other than the at least one designated memory device.

4. The information storage controller according to claim 1, wherein said switch means comprises a plurality of switch units which are equal in number to the total number of memory devices contained in said first and said second group of memory devices.

5. The information storage controller according to claim 1, wherein said switch means comprises a plurality of switches equivalent in number to said plurality of magnetic disk communication means, and wherein each of said plurality of switches connects one of a memory device from said first group of memory devices or a counterpart memory device from said second group of memory devices to said external communications means or said plurality of magnetic disk communication means and connects the other memory device from said first group of memory devices or the counterpart memory device from said second group of memory devices to the other of said external communications means or said plurality of magnetic disk communication means.

* * * * *